United States Patent [19]

Bevilacqua

[11] 3,976,834

[45] *Aug. 24, 1976

[54] EMERGENCY CORE COOLING INJECTION MANIFOLD

[75] Inventor: Frank Bevilacqua, Windsor, Conn.

[73] Assignee: Combustion Engineering, Inc., Windsor, Conn.

[ * ] Notice: The portion of the term of this patent subsequent to Nov. 19, 1991, has been disclaimed.

[22] Filed: Mar. 25, 1974

[21] Appl. No.: 454,054

[52] U.S. Cl. .................................. 176/38; 176/87; 60/DIG. 4
[51] Int. Cl.² ......................................... G21C 9/00
[58] Field of Search ......................... 176/37, 38, 87; 60/DIG. 4

[56] References Cited
UNITED STATES PATENTS

| | | | |
|---|---|---|---|
| 3,115,450 | 12/1963 | Schanz | 176/38 X |
| 3,441,477 | 4/1969 | Stamford et al. | 176/38 X |
| 3,454,466 | 7/1969 | Pitt et al. | 176/38 |
| 3,488,254 | 1/1970 | Davey et al. | 176/38 X |
| 3,849,257 | 11/1974 | Bevilacqua | 176/87 X |

Primary Examiner—Stephen C. Bentley
Assistant Examiner—Peter A. Nelson
Attorney, Agent, or Firm—Stephen L. Borst

[57] ABSTRACT

An emergency core cooling system for a nuclear reactor in which an emergency cooling injection manifold is integrally formed with the guide structure which guides control elements into the reactor core. The guide structure comprises two vertically spaced plates each of which substantially overlies the entire core and which are interconnected by a control element guidance means. A third plate is supported in vertical spaced relationship from one of the plates of the guide structure to define the manifold therebetween. Means are provided for substantially sealing the plenum from the main coolant flow path of the reactor. Means are also provided for introducing emergency coolant into the injection manifold and for dispersing coolant fluid therein into the core in the event of a loss of coolant accident.

16 Claims, 7 Drawing Figures

EMERGENCY CORE COOLING INJECTION MANIFOLD

BACKGROUND OF THE INVENTION

This invention relates to nuclear reactors and more particularly to an emergency core coolant system for cooling the core of a nuclear reactor.

In the event of an accident in which there is a break in the reactor coolant system, it has been postualted that the entire coolant medium which absorbs and removes the heat generated in the nuclear core will be lost or at least considerably decreased. Although control elements are inserted into the core to terminate the fission process upon the occurrence of such an accident, decay heat generated by the already formed fission products is capable of causing fuel or clad melting if sufficient cooling is not supplied to the fuel. Furthermore, the overheating of the fuel cladding can result in a severe adverse chemical reaction with its environment, which may not be reversed by later cooling procedures. Accordingly, it is necessary to provide a sufficient coolant flow immediately to insure that this heating of fuel and cladding does not occur.

In some prior art systems, emergency core coolant water is normally injected into the inlet nozzles of the reactor and allowed to flow downwardly along the normal coolant path to the bottom of the vessel, and then upwardly to the nuclear core. Obviously, with such a system there is necessarily a time delay since the emergency coolant must first flood the bottom of the reactor before flowing upward into the core. Furthermore, the coolant injected into the reactor generates large quantities of steam which may create a pressure buildup in the core and outlet plenum of the reactor, thereby impeding further coolant from reaching the core.

In other prior art systems a special plenum for distributing the emergency coolant fluid is provided in a active region of the reactor. This plenum is fluid coupled to an external source of fluid and means are provided for discharging the coolant supplied to the plenum into the affected regions of the reactor. In these systems the inactive region is normally located above the outlet flow region of the reactor with the special plenum being defined by the reactor vessel and the upper plate of the guide structure or by a separate header component positioned above the guide structure.

It is to an improved form of the special plenum type of emergency core cooling system that the present invention is directed.

SUMMARY OF THE INVENTION

According to the present invention there is provided an emergency core cooling system for use in reactor systems which includes a reactor vessel having a nuclear core therein and a guide structure supported in the vessel in spaced relationship from the core, and having means for guiding control elements which are adapted for vertical reciprocal movement into and out of the core. A main reactor coolant flow path is defined in the reactor vessel for directing coolant fluid during normal operation through the core and then up through one of the spaced plates of the guide structure into the region between the two spaced plates. The emergency core cooling system of the present invention includes a third plate which substantially overlies the core. The plate is supported in vertical spaced relation from one of the two plates of the guide structure to define a plenum therebetween. Means are provided for substantially sealing the plenum from the main coolant flow path. A source of emergency coolant fluid is flow coupled to the plenum to introduce emergency core coolant into the plenum upon the loss of cooling accident. Means are fluid connected to the plenum for discharging emergency coolant therein into the core of the nuclear reactor. The emergency core cooling injection manifold or plenum of the present invention provides an efficient means of dispersing pressurized coolant fluid into the core of the reactor to prevent overheating of fuel elements therein during and after a loss of cooling accident. Furthermore, as will be more apparent hereinbelow, there is flexibility with respect to the location of dispersement into the core. Still further, there is no greater time delay or additional procedures required for removal of reactor hardware above the reactor core for refueling, since the emergency core cooling injection manifold is integrally attached to and forms a part of the existing guide structure.

DESCRIPTION OF THE PREFERRED EMBODIMENT

Figure 1:
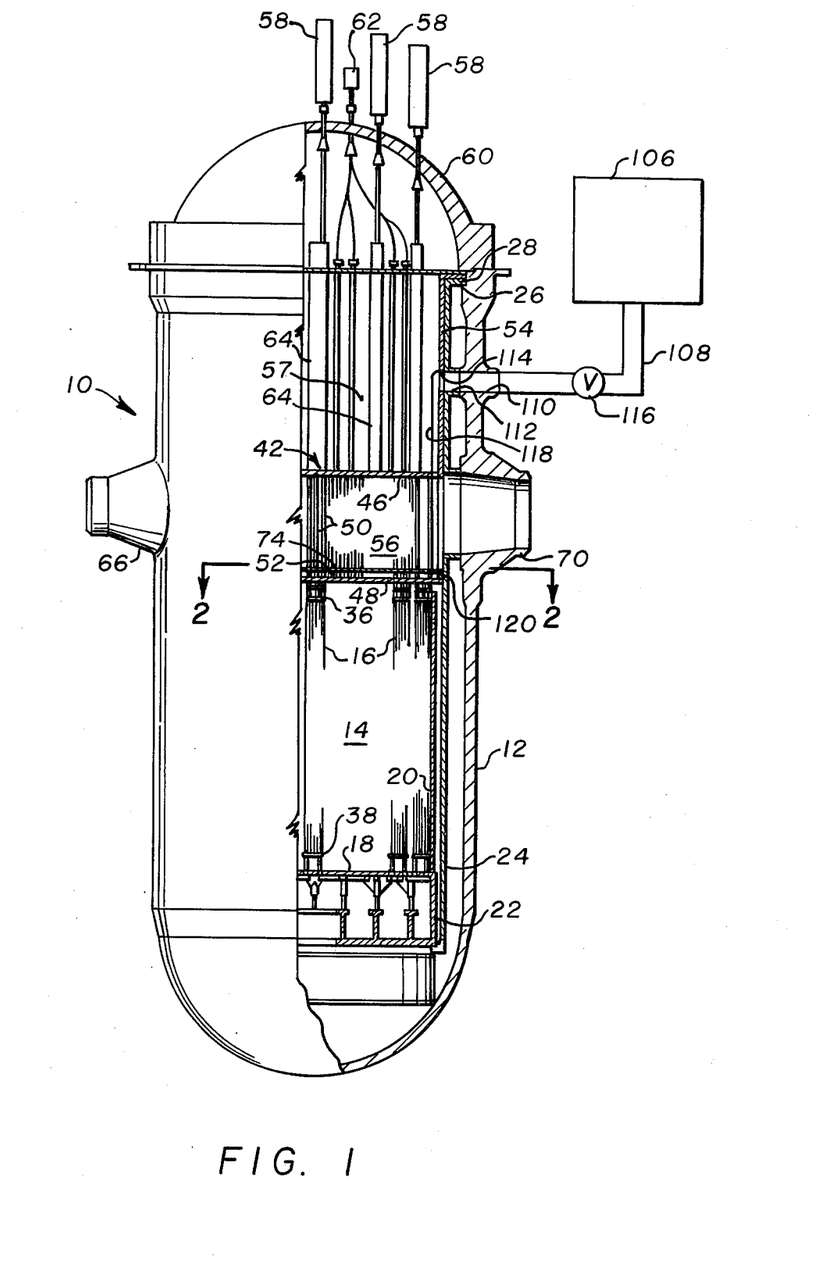
FIG. 1 is an elevation view partly in section of a nuclear reactor incorporating the present invention, the emergency core cooling supply and injection nozzle being rotated into view for illustrative purposes.

Referring now to FIG. 1, there is shown a nuclear reactor 10 including a reactor vessel 12 having an active core or fuel region 14 therein. The core 14 comprises a plurality of fuel assemblies 16 that are supported in position by a lower support plate 18 having apertures (not shown) therein for admitting fluid coolant to the core 14. A core support shroud 20 surrounds the core 14 and is secured to the lower support plate 18. The lower support plate 18 and the entire core assembly 14 are vertically supported by a lower support assembly 22 which is, in turn, supported by the core support barrel 24, the latter being suspended from the vessel flange 26 by an out-turned lip 28 that engages the flange.

Figure 3:
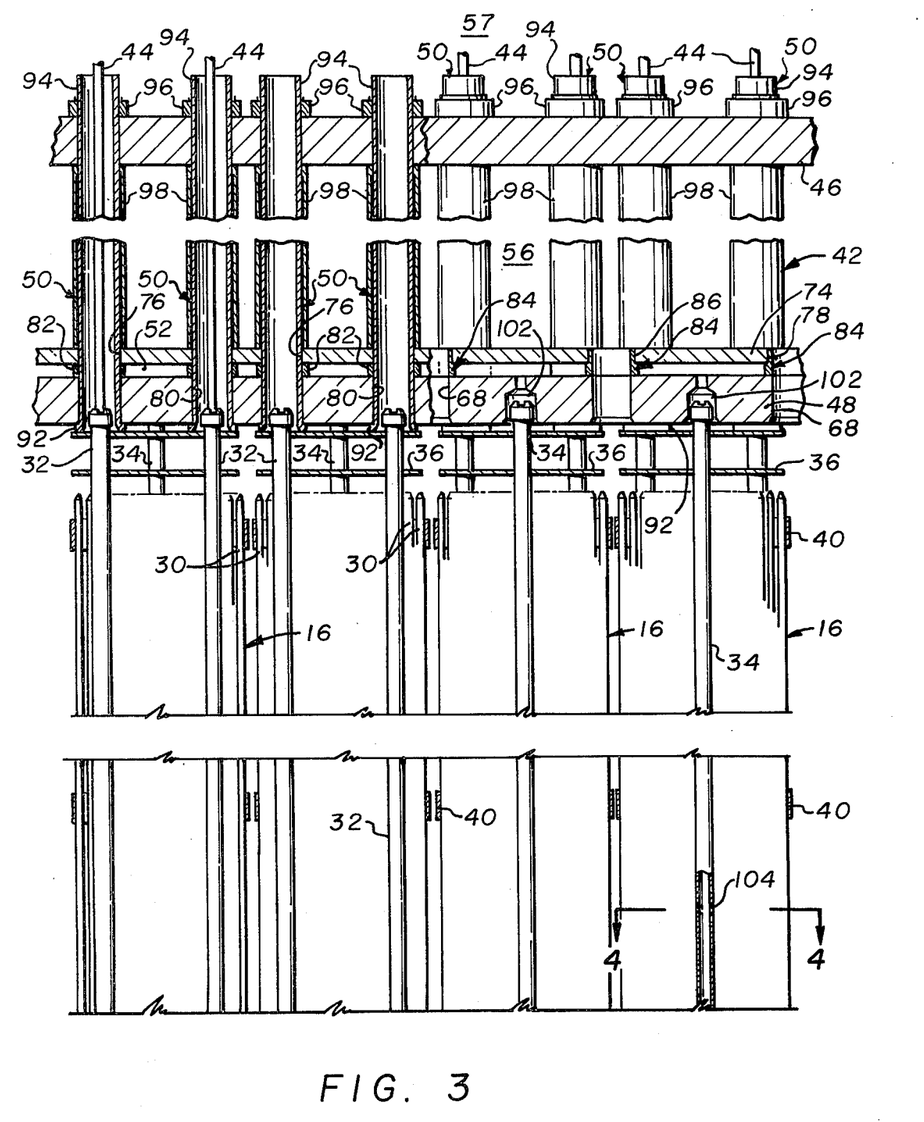
FIG. 3 is an enlarged elevational section taken along line 3—3 of FIG. 2.
Figure 4:
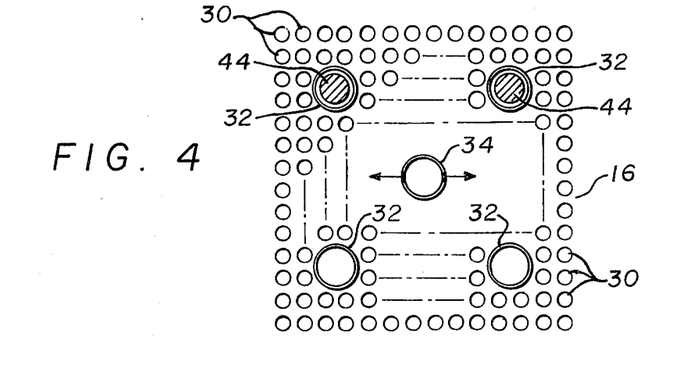
FIG. 4 is a sectional view of a typical fuel assembly taken along line 4—4 of FIG. 3.

In general and as shown in FIGS. 1, 3 and 4, the fuel assemblies 16 each include a plurality of longitudinally extending fuel elements 30 and a plurality of hollow guide tubes 32, 34 interspersed between and within the array of fuel elements 30. In the arrangements shown, the fuel assemblies 16 each contain four vertically extending outer guide tubes 32 which are arranged adjacent the four corners of a fuel assembly 16 and which are attached to upper and lower end fittings 36, 38. A fifth guide tube 34 is centrally located within each of the fuel assemblies 16 and is also attached to the upper and lower end fittings 36, 38. The guide tubes 32, 34 all extend above the upper end fitting 36 and may also extend below the lower end fitting 38, or other means may be provided, to engage the lower support plate 18 to support the fuel assemblies 16 (see FIG. 1). The guide tubes 32, 34 and the upper and lower end fittings 36, 38 provide the structural framework for the fuel assemblies 16.

A plurality of generally rectangularly arranged spacer grids 40 (see FIG. 3) are suitably secured to the guide tubes 32, 34 at spaced elevations therealong. The spacer grids 40 serve to support the plurality of parallel fuel elements 30 in vertical disposition. The grids 40 are of conventional design and include, as is well known, an array of mutually aligned rectangularly arranged openings through which the fuel elements 30 extend.

Located above the core region 14 is a guide structure assembly 42 that serves to align the top end of the fuel assemblies 16 and also to guide control elements 44 into and out of the core region 14. The guide structure assembly 42 shown in the figures is generally of the type described in copending application Ser. No. 266,858, now U.S. Pat. No. 3,849,257 entitled "Guide Structure for Control Elements" and filed June 28, 1972 by Frank Bevilacqua, although other types of guide structures are equally applicable for use with the present invention. The guide structure assembly 42 comprises a pair of vertically spaced tube sheets or plates 46, 48, each of which substantially overlies the entire core 14 and which are rigidly interconnected by a plurality of longitudinally extending hollow tubes 50. The guide structure assembly 42 of the present invention differs from that of the above-noted copending application in that it includes an integral emergency core cooling injection manifold 52 to be described in more detail hereinbelow. The tubes 50 are disposed, as shown in FIG. 3, with their opposite ends located slightly above the upper tube sheet 46 and slightly below the lower tube sheet 48, respectively. The preferred means of securing the tubes 50 to the tube sheets 46, 48 is somewhat different from that disclosed in the copending application to facilitate attachment of the injection manifold 52 and will also be described hereinbelow. A support barrel 54 (see FIG. 1) is secured to the upper tube sheet 46 and suspends the guide structure assembly 42 within the core support barrel 24. Alignment of the respective fuel assemblies 16 is effected by the telescopic reception of the upper ends of the four outer guide tubes 32 within the lower ends of the tubes 50.

Control elements 44 are provided for vertical reciprocal movement into and out of the core 14 for controlling the neutron flux therein. The hollow tubes 50 of the guide structure assembly 42 provide guidance for these control elements 44 and also provide protection from the coolant cross flow in the outlet region 56 between the tube sheets 46, 48. As more fully described in the copending application, the control elements 44 comprise rods containing neutron poison which are situated for telescoping movement within some of the hollow tubes 50 and the fuel assembly guide tubes 32 in alignment therewith. Above the upper tube sheet 46 the control elements 44 may be ganged together and connected to a first type of drive mechanism 58 mounted on the head 60 of the reactor vessel 12, or may be coupled individually to a second type of drive mechanism 62. Operation of drive mechanisms 58, 62 controls the vertical position of the control elements 44 relative to the core 14 which in turn controls the power level of the reactor 10. In the case of ganged control elements, shrouds 64 may be provided which surround the ganged control elements above the upper tube sheet 46.

During normal operation of the reactor 10, liquid coolant, which is usually water, enters the reactor 10 through the inlet nozzles 66 (one of which is shown in FIG. 1) and flows downwardly around the outside of the core support barrel 24. The coolant then flows inwardly and up through openings (not shown) in the lower support assembly 22 and in the lower support plate 18. As the coolant flows upwardly through the reactor core 14, it extracts heat generated therein from the nuclear fission in the fuel assemblies 16. The heated coolant then flows up through openings 68 in the lower tube sheet 48 into the outlet region 56 located between the two tube sheets 46, 48. From the outlet region 56, this fluid is passed through the outlet nozzles 70 (one of which is shown in FIG. 1) and conducted to a vapor generator or the like (not shown), where it serves as the operating medium for heating vaporizable liquids supplied thereto. Also, during this operation, some of the coolant in the reactor 10 flows upwardly through the hollow tubes 50 of the guide structure assembly 42 into the region 57 above the upper tube sheet 46 and back down to the outlet plenum 56 through openings (not shown) in the upper tube sheet 46. This coolant path is necessary to maintain proper cooling of the control elements 44 and to provide proper mixing of the water in the plenum region 57 above the upper tube sheet 46. Essentially the coolant in this region 57 is stagnant relative to the coolant in the outlet region 56. This fluid path up through the hollow tubes 50 is not considered to be part of the main reactor coolant flow path as described hereinabove.

Means are provided in the described reactor arrangement for supplying emergency core coolant to avoid the danger of overheating the component parts of the apparatus in the event of an occurrence of an emergency condition, such as for example, a loss of coolant accident wherein primary coolant is prevented from circulating through the reactor core 14. In particular this means comprises a source of emergency core coolant liquid stored externally of the reactor vessel, an injection manifold or plenum 52 integrally formed with the guide structure 42, and means for distributing the emergency core coolant liquid to the manifold 52 and then into the reactor core 14.

Figure 2:
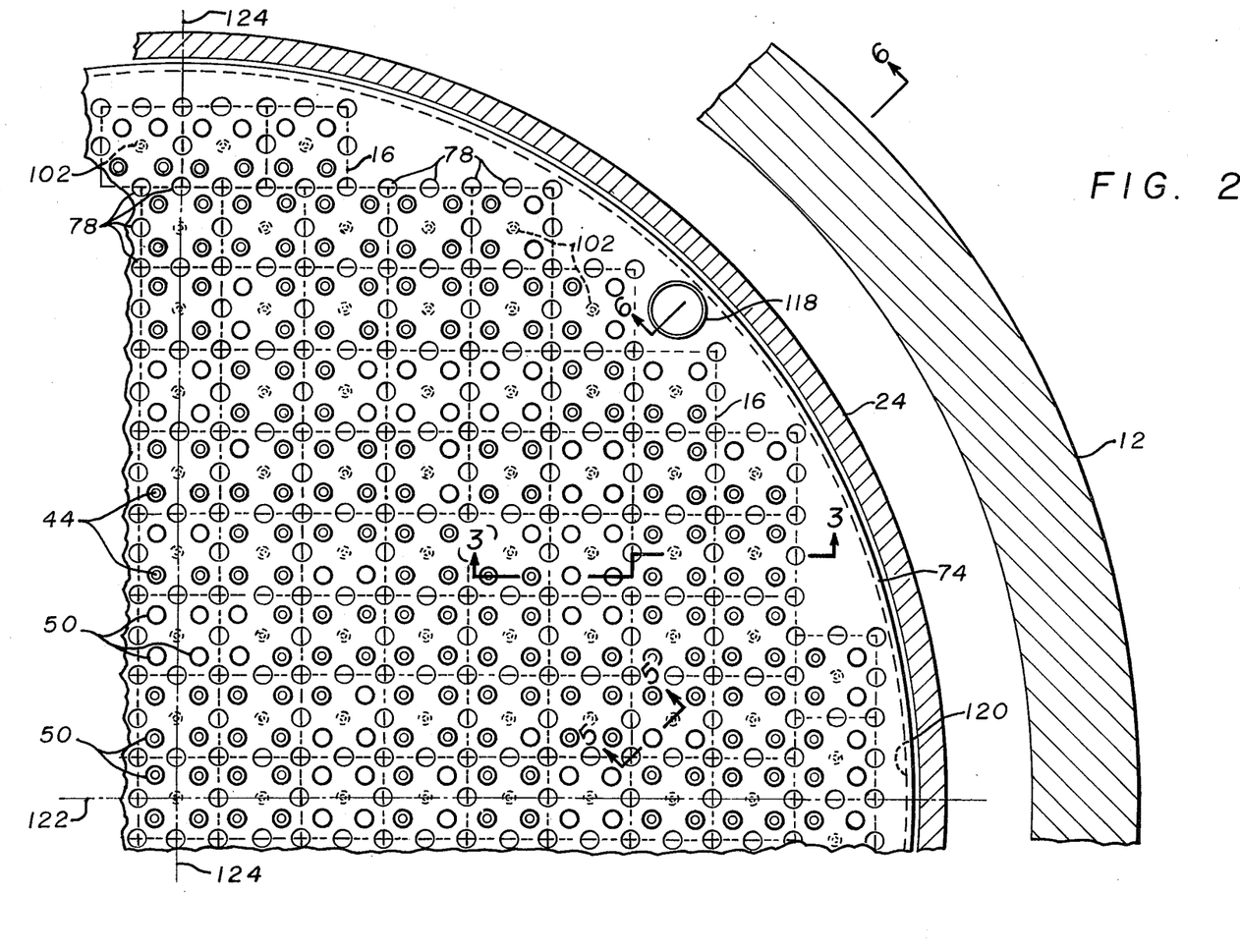
FIG. 2 is a sectional view taken along line 2—2 of FIG. 1.
Figure 5:
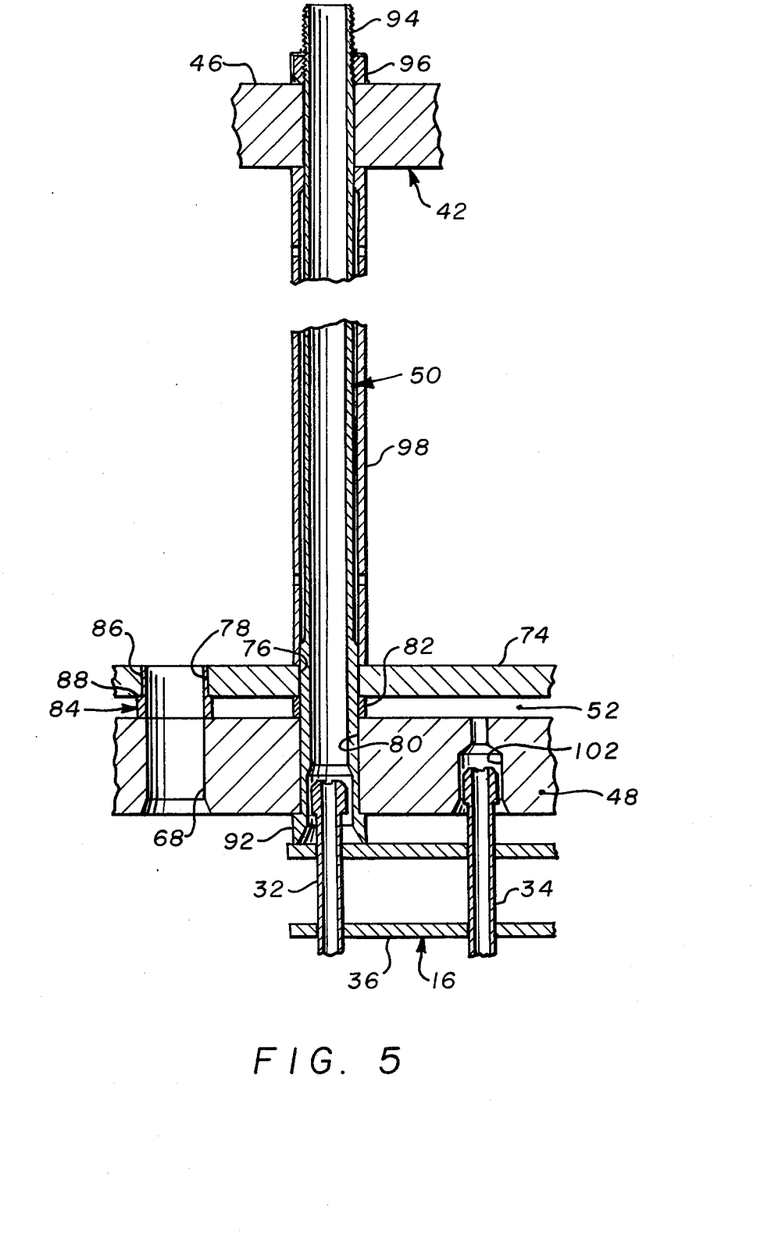
FIG. 5 is an enlarged sectional view taken along line 5—5 of FIG. 2.

In one embodiment of the present invention, as best seen in FIGS. 2, 3, 5 and 6, the injection manifold or plenum 52 is located between the lower tube sheet 48 of the guide structure assembly 42 and a plate 74 positioned in spaced relationship thereabove in the outlet region 56. As seen in FIG. 2, the plenum forming plate or third plate 74 of the guide structure assembly 42 has a first and second plurality of holes or openings 76, 78 therethrough to permit passage through the plate 74 of the hollow tubes 50 and main reactor coolant fluid, respectively. The holes 76, 78 of the first and second plurality in the third plate 74 are each aligned with similar holes or openings 80, 68 in the lower tube sheet 48. Annular spacers or sleeves 82, 84 for the aligned openings 76, 80 and 78, 68 are provided between the two plates 48, 74, the spacers 82, 84 each being co-axially aligned with one of the aligned openings 76, 80 or 78, 68. The annular spacers 82, 84 serve to maintain the axial spacing between the two plates 48, 74 defining injection manifold or plenum 52 and further to substantially seal the main reactor coolant fluid from the interior of the manifold 52. In the preferred embodiment, as shown in FIG. 5, the spacers 84 for the main coolant flow holes 78, 68 are maintained in co-axial alignment by having a reduced portion 86 which is received within the flow hole 78 in the third plate 74. Shoulders 88 formed in the outer surface of the spacers 84 act to support the plate 74 above the lower tube sheet 48. The lower ends of the spacers 84 engage the upper surface of a lower tube sheet 48 and are concentrically positioned over the flow hole 68 in the lower tube sheet 48. This offers little increase in fluid resistance to the coolant flowing therethrough during normal reactor operation. The spacers 82 for the hollow tube openings 76, 80 are maintained in co-axial alignment therewith by being concentrically positioned around the hollow tubes 50 between the two plates 48, 74.

The hollow tubes 50 are secured to the upper and lower tube sheets 46, 48 and the third plate 74 secured to the guide structure assembly 42 by use of double concentric tubes similar to the method disclosed in the aforementioned copending patent application. The inner tubes 50 (i.e. the tubes which guide the control elements 44 and which receive the ends of the fuel assembly guide tubes 32) each extend through the two tube sheets 46, 48 with the opposite ends located slightly above the upper tube sheet 46 and below the lower tube sheet 48, respectively. Each of the inner tubes 50 has a flanged portion 92 at one end and a threaded portion 94 at the other end which is adapted to receive a nut 96. The second outer tubes 98 are concentrically disposed around each of the inner tubes 50 between the upper tube sheet 46 and the third plate 74. By tightening the nuts 96 on each of the inner hollow tubes 50, the concentric outer tubes 98 and the sleeves or spacers 82, 84 around the tubes 50 or in the flow holes 78 are placed in compression while the inner hollow tubes 50 are placed in tension. This arrangement provides a rigid construction for the guide structure assembly 42 while at the same time it rigidly secures and spaces the third plate 74 above the lower tube sheet 48. Furthermore, by placing the sleeves 82, 84 between the third plate 74 and the lower tube sheet 48 in compression, this provides a more efficient seal to prevent ingress of main coolant fluid into the injection manifold 52.

It should be noted that it is not necessary to provide a completely effective seal between the manifold 52 and the main reactor coolant flow path. During normal reactor operation, leakage of main coolant fluid into the manifold plenum 52 will be minimal due to the higher flow resistance into the plenum 52 as compared to the flow resistance through the flow holes 68, 78 to the outlet plenum. This minimal leakage will have no adverse effect on reactor operation. During an accident condition, leakage will again be minimal and most emergency core coolant liquid will be dispersed through the distribution means as described hereinbelow. Any leakage of emergency core coolant liquid which does not occur out of the manifold 52 will merely aid in further cooling of the reactor 10.

In the preferred embodiment emergency core coolant fluid introduced into the injecton manifold or plenum 52 is directed to the core 14 by means of the central guide tubes 34 of selected fuel assemblies 16. The lower tube sheet 48 of the guide structure assembly 42 is provied with openings 102 in the lower surface thereof which are located to receive the upper ends of the fuel assembly central guide tubes 34. Although it is contemplated that each of the openings 102 will communicate with the interior of the manifold or plenum 52 several of the openings could be plugged or otherwise not communicate completely through the tube sheet 48 with the plenum 52 if it is desired to achieve some other particular type of cooling pattern in the core 14. For those openings 102 which do communicate with the plenum 52, emergency cooling liquid will be directed therethrough and into and down the interior of hollow central guide tubes 34. Exit openings 104 in the sidewalls of the central guide tubes 34 are provided along the longitudinal length and around the circumference thereof to permit the coolant to exit in any desired region of the core 14. Although only two exit openings 104 ae shown for the central guide tubes 34 in FIGS. 3 and 4, additional openings could be provided at other vertical and/or circumferential positions to direct coolant to particular regions such as "hot spots" in the core 14. The particular path of emergency coolant distribution for any particular core, of course, depends on a number of factors including the locations and types of each of the various fuel assemblies 16 comprising the core. By spraying emergency coolant in the interior region of the core 14, the emergency coolant is located closer to each of the fuel elements 30 upon which the emergency coolant must operate. Consideration, of course, must given to insure that each of the fuel elements 30 will receive adequate cooling to prevent rupture thereof and release of contaminated fission products.

Figure 6:
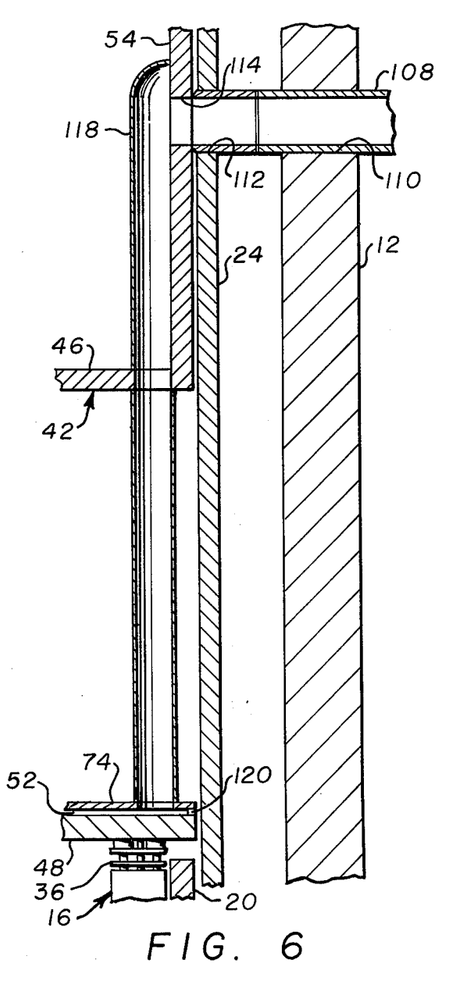
FIG. 6 is an elevational section taken along line 6—6 of FIG. 2.

Emergency core coolant fluid is introduced into the injection manifold or plenum 52 from a source of coolant stored externally of the reactor vessel 12. The coolant liquid is contained in a storage tank 106 which preferably includes a means (not shown) for maintaining the liquid under an elevated pressure within the tank 106. It is contemplated that a pressure between 300 and 1,200 psi will be suitable for this purpose; however, higher or lower pressures are not excluded. A flow line 108 connects the tank 106 in fluid communication with an emergency core coolant injection nozzle 118 located within the interior of the guide structure support barrel 54 through aligned openings 110, 112, 114 provided in the vessel wall 12, the core barrel 24, and the guide structure barrel 54, respectively. A valve 116 is provided in this line 108 and is activated in the event of an accident to supply emergency coolant to the injection nozzle 118. As best seen in FIG. 6, the injection nozzle 118 extends downwardly through the upper tube sheet 46 through the third plate 74 of the guide structure assembly 42 and is in communication at its lower end with the interior of the injection manifold or plenum 52. A spacer ring 120 is secured, as by welding, to the third plate 74 and the lower tube sheet 48 around the circumference of the tube sheet 48 to substantially seal the interior of the plenum 52 from the main reactor coolant fluid.

It will be appreciated that the emergency coolant liquid containment systems as described herein, is for the purpose of illustration only, and that other and varied forms of cooling containment systems may be alternatively provided. For example, a plurality of tanks 106 and associated conductors 108 can be caused to communicate with a plurality of injection nozzles 118 at circumferentially spaced locations about the guide structure assembly 42. Preferably, to insure reliability and to provide redundancy and additional safety, it is contemplated that four emergency coolant liquid containment systems 106, 108 and injection nozzles 118 will be provided which would be spaced equally about the circumference of the reactor vessel 12. The location of one injection nozzle 118 for such an arrangement is shown in FIG. 2. Preferably the injection nozzle 118 is circumferentially spaced away from the entrance to the outlet nozzle 70 (which lies along the core centerline 122) so as not to be subjected to the high cross flow load thereat. For the remaining core quadrants, the other injection nozzles would be similarly located away from the outlet nozzles.

FIG. 2 also shows a typical arrangement of the flow holes 68, 78, the hollow tubes 50 of the guide structure assembly 42, and the distribution holes 102 in the lower tube sheet 48 for one quadrant of the core 14, the fuel assemblies 16 therein being shown in dotted outline. The remaining three quadrants comprising the core 14 are symmetrical about the two core centerlines 122, 124. Four hollow tubes 50 in which the upper ends of the guide tubes 32 of the fuel assemblies 16 are received, are provided for each fuel assembly 16, some of the hollow tubes 50 being shown with control elements 44 situated therein. An emergency core coolant distribution hole 102 is provided in alignment with the central guide tube 34 of each fuel assembly 16 and into which the central guide tube 34 will be received. Also, axially aligned flow holes 68, 78 in plates 48 and 74 respectively are arranged to lie along the projected peripheries of the fuel assemblies 16.

In the event of an emergency condition requiring the admission of supplementary coolant liquid to compensate for the loss of primary coolant and to remove the decay heat from the reactor core 14, the valve 116 in the conduit line 108 is actuated to an open position thereby placing the pressurized interior of the emergency coolant storage tank 106 in fluid communication with the emergency core cooling injection nozzle 118. Emergency coolant liquid under pressure is thereby caused to flow into the injection manifold or plenum 52 integrally formed with the guide structure assembly 42. In this region 52, the liquid passes down through the distribution holes 102 into the central guide tubes 34 whose upper ends are open and from there, downward toward the center of the core 14. From the central guide tubes 34, the liquid is directed through the radial openings 104 provided therein into the core 14 where it extracts the decay heat from the reactor fuel elements 30 to thereby maintain the temperatures of the apparatus within tolerable limits.

One advantage obtained with use of the emergency core coolant system of the present invention is derived from the fact that the emergency coolant discharged into the core 14 is pressurized. Because the coolant is applied at an elevated pressure, the possibility of steam blockage within the upper region of the reactor core 14 is removed, thereby insuring that the coolant liquid will flow to all the affected regions of the core 14. With coolant fluid being transferred into the reactor vessel 12 at a pressure greater than that of the vapor generated therein in the event of an accident, the latter will simply be forced through the reactor or any openings in the vessel 12 such as the inlet or outlet nozzles 66, 70. Of course, as can be appreciated, the realization of this advantage will be dependent on the pressure maintained in the storage tank 106 and on the volume of the injection manifold 52 and distribution means as well as on other factors which are known to those skilled in the art.

Figure 7:
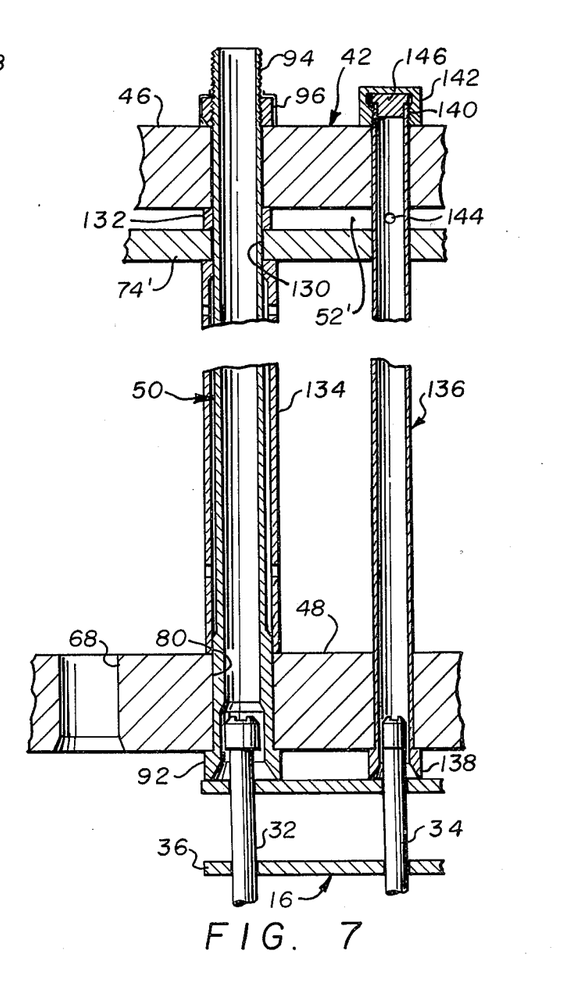
FIG. 7 is a view similar to FIG. 5 of an alternative arrangement of the present invention.

Another embodiment of the present invention is shown in FIG. 7. In this form of the present invention the plenum forming plate is indicated in the drawing as 74' and is located adjacent the upper tube sheet 46 of the guide structure assembly 42. The injection manifold, indicated as 52', is formed between the plate 74' and the upper tube sheet 46. This third plate 74' of the guide structure assembly 42 is provided with openings 130 therethrough for the hollow tubes 50 of the guide structure assembly 42 and is integrally attached to the guide structure assembly 42 in spaced relationship by means of spacer sleeves 132 and double concentric tubes 50, 134 in a manner similar to that shown for the embodiment in FIGS. 3 and 5. The guide structure inner hollow tubes 50 each have a flanged end portion 92 and a threaded end portion 94, and the spacer sleeves 132 and outer tubes 134 are concentrically positioned around the inner tubes 50 between the upper tube sheet 46 and the third plate 74', and the third plate 74' and the lower tube sheet 48, respectively. A nut 96 threaded onto the threaded end 94 of the inner tubes 50 places the outer tubes 134 and spacers 132 in compression and the inner tubes 50 in tension. Pressurized emergency coolant liquid is introduced into the injection plenum 52' in a similar manner to that described hereinabove (i.e. an emergency injection nozzle 118, in fluid communication with the storage tank 106, communicates at its lower end with the plenum 52' through the upper tube sheet 48).

In this alternative embodiment the distribution means for discharging emergency core coolant fluid in the injection plenum 52' into the core 14 comprises a plurality of hollow distribution tubes 136 which extend through all three plates 46, 74', 48 and which have their opposite ends located slightly above the upper tube sheet 46 and slightly below the lower tube sheet 48, respectively. The distribution tubes 136, which each have a flanged end 138 and a threaded end 140, are attached to the guide structure assembly 42 by tightening nuts 142 onto the threaded end 140 to tension the tubes 136. The distribution tubes 136 are in alignment with and have their lower ends positioned so as to receive the upper ends of the central guide tubes 34 of selected fuel assemblies 16. The distribution tubes 136 each have radial openings 144 in the sidewall thereof at the elevation of the injection plenum 52' to provide fluid communication between the plenum 52' and the interior of these tubes 136. The upper ends of the distribution tubes 136 are each sealed by a cap 146 which is held in place by the nut 142 securing the tube 136 to the guide structure assembly 42. The central guide tubes 34 of the fuel assemblies 16 communicating with the plenum 52' are similar to those described hereinabove (see FIGS. 3 and 4) in that they have radial openings 104 in the sidewalls at desired vertical and circumferential positions along the length thereof to spray emergency coolant outward into the core 14 at desired locations and in desired directions.

The distribution tubes 136, as shown, are of a smaller inner diameter than the inner diameter of the hollow tubes 50 of the guide structure assembly 42 to insure that the emergency core coolant liquid will remain pressurized to a sufficient level to be discharged into the core 14. Of course, this dimension may be varied and in fact, may have a larger inner diameter depending on a number of distribution tubes 136 and the pressure maintained in the externally located storage tank 106.

It should also be noted that with the use of this alternative embodiment, the lower tube sheet 48 only is provided with flow holes 68 to permit circulation of the main reactor coolant fluid between the core 14 and the outlet region 56.

While preferred embodiments of the invention have been shown and described, it will be understood that these are merely illustrative of the invention, rather than restrictive, and that changes may be made without departing from the scope of the invention.

What is claimed is:

1. A nuclear reactor system comprising:
   a reactor vessel having a nuclear core therein comprised of a plurality of fuel assemblies;
   a guide structure supported in said vessel in vertically spaced relationship from said core, said guide structure including two vertically spaced plates each of which substantially overlies said core, said two plates being interconnected and vertically spaced by a plurality of control element guidance means;
   a plurality of control elements situated within said control element guidance means and adapted for vertical reciprocal movement into and out of said core;
   a main coolant flow path defined in said reactor vessel for directing coolant fluid during normal operation through said core and then through one of said plates of said guide structure into the region between said two spaced plates;
   a third plate substantially overlying said core;
   means for supporting said third plate in vertical spaced relation from one of said two plates of said guide structure to define a plenum therebetween;
   means for substantially sealing said plenum from said main coolant flow path;
   a source of emergency coolant fluid;
   means for flow coupling said source to said plenum for introducing emergency coolant fluid into said plenum; and
   means connected to said plenum for discharging emergency coolant therein into said core of said nuclear reactor.

2. The reactor system of claim 1 wherein said guide structure is supported above said core and wherein the lower of said two plates of said guide structure serves to maintain alignment of the upper ends of said fuel assemblies in said core, said lower plate of said guide structure having a plurality of flow holes therethrough forming a portion of said main coolant flow path.

3. The reactor system of claim 2 wherein said third plate has a plurality of holes therethrough, wherein said means for supporting said third plate supports said third plate above said lower plate of said guide structure to define said plenum between said third plate and said lower plate, said plurality of holes in said third plate being in alignment with said plurality of flow holes in said lower plate; and wherein said means for sealing includes a plurality of annular sleeves positioned between and in sealing relationship with said third plate and said lower plate, each of said annular sleeves being coaxially disposed with respect to one of said holes in said third plate.

4. The reactor system of claim 3 wherein said discharging means includes a plurality of discharge holes in said lower plate of said guide structure.

5. The reactor system of claim 4 wherein said discharge means further includes: longitudinally extending discharge channels within some of said fuel assemblies, each of said channels having openings in the side wall along the length thereof; and tubular connecting means for each of said channels, each of said tubular connecting means having one end in registry with said channel and the other end received within one of said discharge holes in said lower plate of said guide structure to communicate with said plenum.

6. The reactor system of claim 5 wherein there are a plurality of aligned openings in said third plate and said upper and lower plates of said guide structure to permit passage therethrough of said control elements; wherein said fuel assemblies include longitudinally extending control channels, and hollow alignment means affixed to the upper end of said fuel assemblies, said hollow alignment means having one end in registry with one of said control channels and the other end received in one of said aligned openings in said lower plate of guide structure, said control elements being telescopingly reciprocally movable within said alignment means and said control channels; and wherein said sealing means includes means positioned between said third plate and said lower plate for sealing said aligned openings from said plenum.

7. The reactor system of claim 6 wherein said control element guidance means comprises a plurality of longitudinally extending hollow tubes extending between and through said upper and lower plates and said third plate, said tubes being aligned with said aligned opening in said upper, lower and third plates, each of said hollow tubes being adapted to house only one of said control elements for telescoping movement therewithin; wherein said alignment means of said fuel assemblies are received within the lower end of said hollow tubes in said aligned openings in said lower plate; and wherein said means positioned between said third plate and said lower plate for sealing said aligned openings from said plenum comprises tubular spacers through which pass said hollow tubes, said tubular spacers having their opposite ends disposed in abutting relation to the lower surface of said third plate and the upper surface of said lower plate.

8. The reactor system of claim 7 wherein each of said hollow tubes has a flange on one end which engages one of said upper and lower plates and a threaded portion of the other end; wherein there is a concentric tube for each of said hollow tubes extending between said upper plate and said third plate and which surrounds said hollow tube, and a nut adapted to be threaded onto said threaded portion of each of said hollow tubes whereby each of said hollow tubes is placed in tension and each of said concentric tubes and each of said annular sleeves and tubular spacers are placed in compression.

9. The reactor system of claim 7 wherein said means for sealing further comprises: a flange on each of said hollow tubes at one end, a threaded portion on the other end of each of said hollow tubes, a concentric tube for each of said hollow tubes extending between said upper plate of said guide structure and said third plate and surrounding said hollow tube, and a nut adapted to be threaded onto the threaded portion of each of said hollow tubes to place said annular sleeves and tubular spacers in compression between said lower plate and said third plate.

10. The reactor system of claim 2 wherein said means for supporting said third plate supports said third plate below said upper plate of said guide structure to define said plenum between said third plate and said upper plate; and wherein said means for discharging comprises a plurality of hollow discharge tubes extending downward from said third plate and through said lower plate of said guide structure, said plenum being in fluid communication with the interior of said hollow discharge tubes at the upper end of said tubes to discharge emergency coolant into said discharge tubes and the lower end of said hollow tubes being in fluid communication with said core.

11. The reactor system of claim 10 wherein said discharge means further includes: longitudinally extending discharge channels within some of said fuel assemblies, each of said channels having openings in the side wall along the length thereof; and tubular connecting means for each of said channels, each of said tubular connecting means having one end in registry with said channel and the other end received within the lower end of one of said hollow discharge tubes to communicate therewith.

12. The reactor system of claim 11 wherein there are a plurality of aligned openings in said third plate and said upper and lower plates in said guide structure to permit passage therethrough of said control elements; and wherein said fuel assemblies include longitudinally extending control channels and hollow alignment means affixed to the upper end of said fuel assemblies, said hollow alignment means having one end in registry with one of said control channels and the other end received in one of said aligned openings in said lower plate of said guide structure, said control elements being telescopingly reciprocally movable within said alignment means and said control channels; and wherein said sealing means includes means positioned between said third plate and said upper plate for sealing said aligned openings from said plenum.

13. The reactor system of claim 12 wherein said control element guidance means comprises a plurality of longitudinally extending hollow tubes extending between and through said upper and lower plates and said third plate, said tubes being aligned with said aligned openings in said upper, lower and third plates, each of said hollow tubes being adapted to house only one of said control elements for telescoping movement therewithin; wherein said alignment means of said fuel assemblies are received within the lower end of said hollow tubes in said aligned openings in said lower plate; and wherein said means positioned between said third plate and said upper plate for sealing said aligned openings from said plenum comprises tubular spacers through which pass said hollow tubes, said tubular spacers having their opposite ends disposed in abutting relation to the upper surface of said third plate and the lower surface of said upper plate.

14. The reactor system of claim 13 wherein said means for sealing further comprises: a flange on one end of each of said hollow tubes extending between and through said plates which engages one of said upper and lower plates, a threaded portion on the other end of each of said hollow tubes, a concentric tube for each of said hollow tubes extending between said third plate and said lower plate and surrounding said hollow tube, and a nut adapted to be threaded onto said threaded portion of each of said hollow tubes to place said tubular spacers surrounding said hollow tubes in compression between said third plate and said upper plate.

15. The reactor system of claim 14 wherein each of said hollow discharge tubes for discharging coolant fluid to said core extends at its upper end through both said third plate and said upper plate of said guide structure, each of said discharge tubes being sealed at its upper end above said upper plate, and having an opening in the side wall thereof at a location between said upper plate and said third plate to provide communication between said plenum and the interior of said discharge tubes.

16. The reactor system of claim 2 wherein said source of emergency coolant fluid is positioned outside of said reactor vessel, and wherein said means for flow coupling said source to said plenum comprises a first conduit means extending from said source through the wall of said reactor vessel to the interior of said vessel and a second conduit means extending longitudinally downward and through at least said upper plate of said guide structure, said second conduit means being flow coupled at its upper end to said first conduit means and being in fluid communication with said plenum at its lower end.

* * * * *